June 17, 1952  V. A. RAYBURN  2,600,574
APPARATUS FOR HANDLING STRIPS OF PLASTIC MATERIAL
Filed Aug. 14, 1945  6 Sheets-Sheet 2

INVENTOR
V.A. RAYBURN
BY
ATTORNEY

June 17, 1952  V. A. RAYBURN  2,600,574
APPARATUS FOR HANDLING STRIPS OF PLASTIC MATERIAL
Filed Aug. 14, 1945  6 Sheets-Sheet 3

INVENTOR
V.A. RAYBURN
BY
ATTORNEY

June 17, 1952 V. A. RAYBURN 2,600,574
APPARATUS FOR HANDLING STRIPS OF PLASTIC MATERIAL
Filed Aug. 14, 1945 6 Sheets-Sheet 4

FIG. 5

INVENTOR
V.A. RAYBURN
BY
ATTORNEY

June 17, 1952  V. A. RAYBURN  2,600,574
APPARATUS FOR HANDLING STRIPS OF PLASTIC MATERIAL
Filed Aug. 14, 1945  6 Sheets-Sheet 5

INVENTOR
V.A. RAYBURN
BY
ATTORNEY

June 17, 1952  V. A. RAYBURN  2,600,574
APPARATUS FOR HANDLING STRIPS OF PLASTIC MATERIAL
Filed Aug. 14, 1945  6 Sheets-Sheet 6

INVENTOR
V. A. RAYBURN
BY
ATTORNEY

Patented June 17, 1952

2,600,574

UNITED STATES PATENT OFFICE 2,600,574

APPARATUS FOR HANDLING STRIPS OF PLASTIC MATERIAL

Vincent A. Rayburn, Baltimore, Md., assignor to Western Electric Company, Incorporated, New York, N. Y., a corporation of New York Application August 14, 1945, Serial No. 610,833

18 Claims. (Cl. 271—2.1)

1

This invention relates to apparatus for handling strips of plastic material and more particularly to apparatus for cooling and conveying strips of plastic material.

In the manufacture of strips from rubber or rubber-like compounds having high heat retentivities, the compound must be thoroughly mixed, and the mixing thereof heats the compound to a high temperature. Protracted exposure of the compound after being heated by the mixing is likely to impair the qualities of the compound. The compound, after it has been mixed and formed into a strip, retains a considerable amount of heat and frequently must be cooled before it may be subjected to certain subsequent processing operations.

An object of the invention is to provide new and improved apparatus for handling strips of plastic material.

An apparatus forming one embodiment of the invention comprises means for engaging a strip of material therebetween, means for guiding the strip-engaging means, and means for moving the strip-engaging means in unison to advance a strip of material engaged thereby.

This apparatus is provided with conveyer elements, each of which has a pair of roller chains carrying a plurality of slats, which are staggered with respect to the slats of the other conveyer element. Guiding means serve to guide the conveyer elements in substantially parallel paths away from a mill for forming a strip of plastic material and a main driving means advances the conveyer elements in unison while an auxiliary driving means aids in advancing the conveyer elements. The guiding means separates the two conveyer elements at an exit end thereof and a pair of strippers serve to push the strip out of engagement with the conveyer elements at the points at which they are separated, after which a flipper moves the strip away from the stripping means toward a drier and a shearer. Sprays of water are directed upon the strip as it is advanced through the apparatus to cool it.

A complete understanding of the invention may be obtained from the following detailed description of an apparatus constituting a specific embodiment thereof, when read in conjunction with the appended drawings, in which.

2

Figure 7:
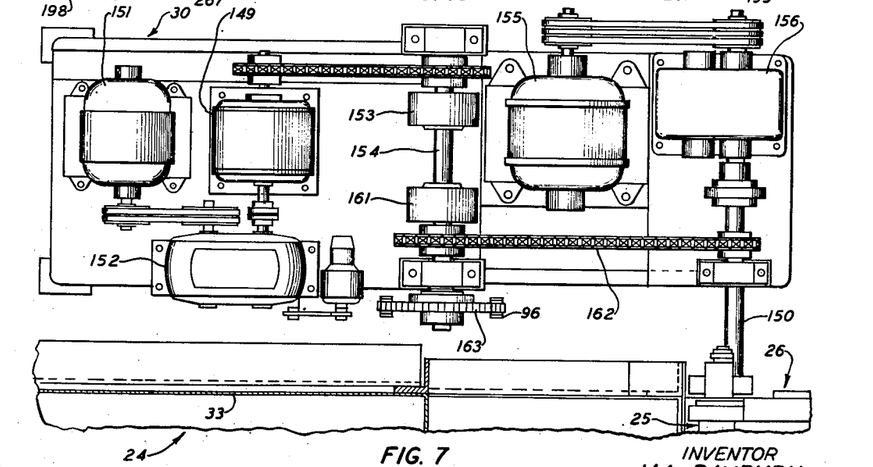
Fig. 7 is an enlarged, fragmentary, horizontal section taken along line 7—7 of Fig. 1.
Figure 8:
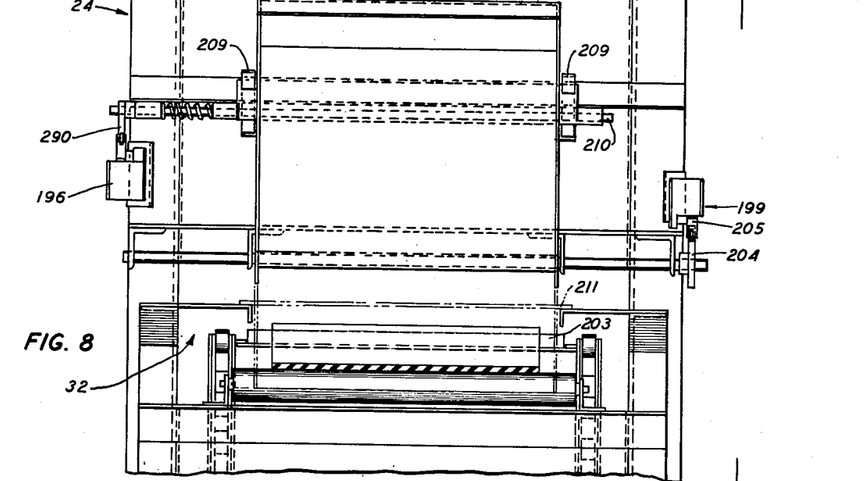
Fig. 8 is an enlarged, fragmentary, vertical section taken along line 8—8 of Fig. 1.

Referring now in detail to the drawings, a strip 20 (Fig. 1) made of a plastic material, such as a vulcanizable composition of rubber, "Neoprene" or other rubber-like compound, is formed from a mass 21 of the plastic material on a mill 22 of a well known type and is separated from the mill by a suitable stripper 23. The strip 20 is drawn through a cooling tower 24, which cools the strip, after which the strip is drawn through a drier 25, which dries the strip, and a shearer 26, which cuts the strip into sheets. The cooler 24, the drier 25 and a shearer 26 are driven by a differential drive assembly 30 (Figs. 7 and 8). The drier 25 is disclosed and claimed in Rayburn Patent 2,501,875, issued March 28, 1950, the shearer 26 is disclosed and claimed in Rayburn et al. Patent 2,429,944 and Rayburn Patent 2,429,945, both issued October 28, 1947, and the differential drive assembly 30 is disclosed and claimed in Rayburn Patent 2,531,644, issued November 28, 1950.

Figure 3:
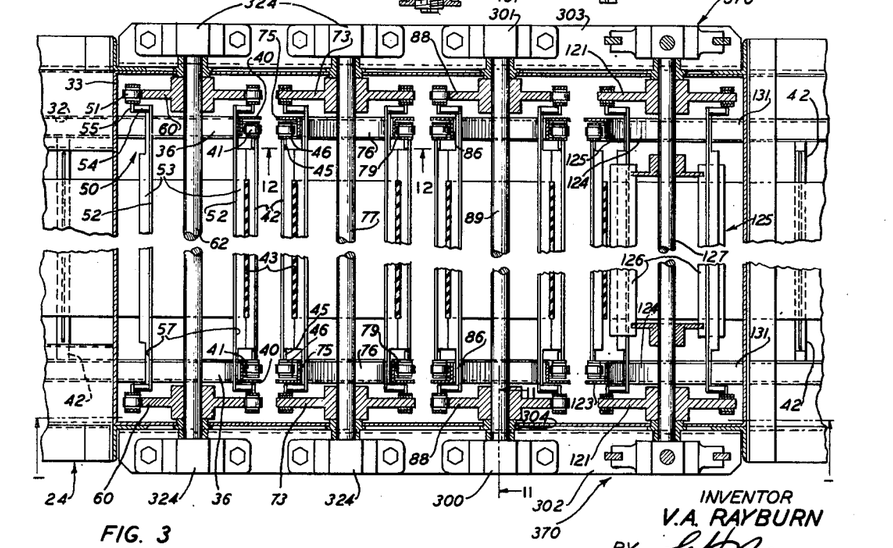
Fig. 3 is an enlarged, horizontal section taken along line 3—3 of Fig. 1.
Figure 5:
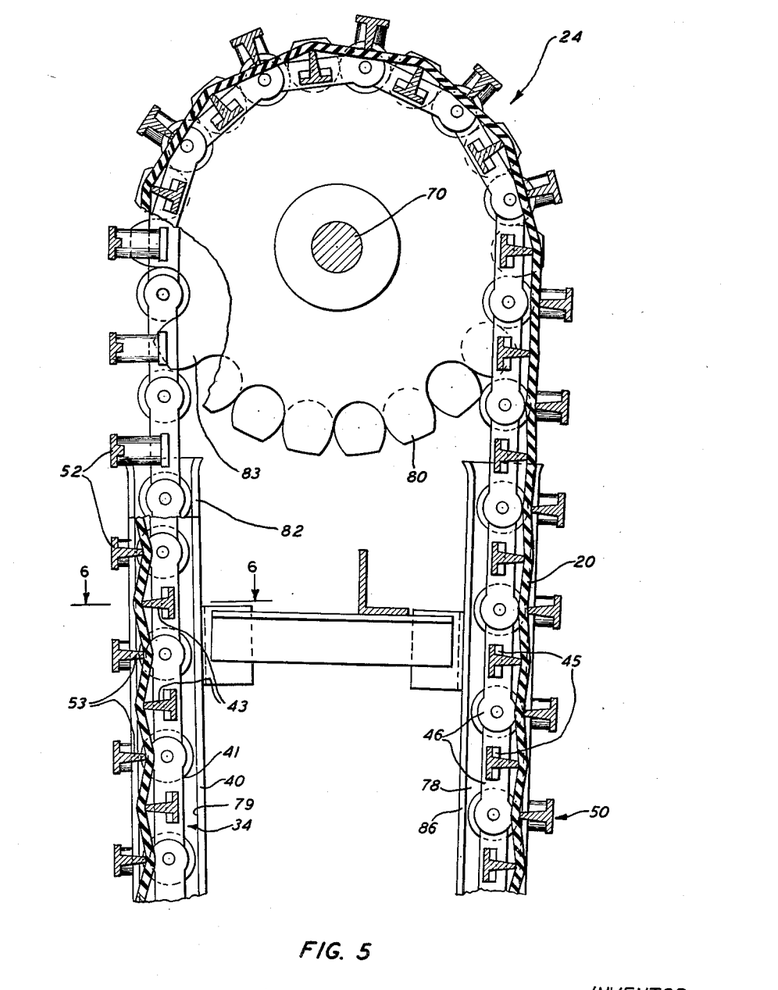
Fig. 5 is an enlarged, fragmentary, vertical section taken along line 5—5 of Fig. 2.
Figure 6:
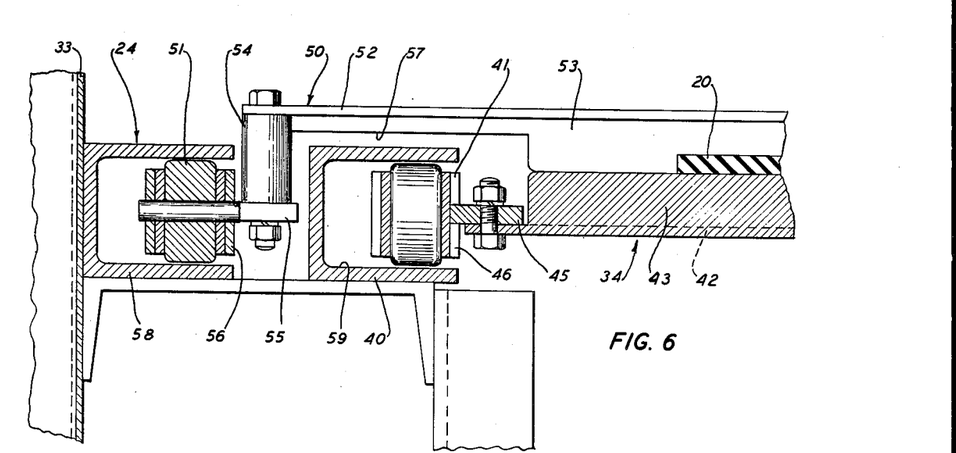
Fig. 6 is an enlarged, fragmentary, horizontal section taken along line 6—6 of Fig. 5.

A pair of mill rolls 31—31 (Fig. 1) serves to roll the mass 21 of material into a continuous strip 20, which is stripped off of the rolls by the stripper 23. The strip 20 is then guided to an entrance 32 formed in a housing 33 of the cooler 24, and is advanced into the housing 33 upon a lower conveyer element 34, just after the latter passes around guide sprockets, which are illustrated by a guide sprocket 35 and are mounted on a shaft 36. The lower conveyer element 34 then passes into arcuate portions 36—36 (Figs. 1 and 3) of guide tracks 40—40. The lower conveyer element includes a pair of matched roller chains 41—41 (Figs. 5 and 6), and a plurality of T-shaped carrier slats 42—42 having stems 43—43 secured to lugs 45—45 formed on inner links 46—46 of the roller chains. The carrier slats 42—42 are of T-shaped cross section and are positioned with the stems 43—43 of the T's pointed toward the strip 20.

An upper conveyer element 50 (Figs. 1, 2 and 5) includes a pair of matched roller chains 51—51, which are identical with the chains 41—41, and carrier slats 52—52 of T-shaped cross section, which extend between the chains 51—51. The roller chains 51—51 are spaced farther apart than are the roller chains 41—41, and stems 53—53 of the T-shaped slats 52—52 are provided with relieved portions 57—57 at the ends thereof to provide clearance for the roller chains 41—41 wherever the roller chains 41—41 lie in the same plane as the roller chains 51—51. The slats 52—52 are longer than the slats 42—42 and are secured to the chains 51—51 by bored stanchions 54—54, which are secured to lugs 55—55 formed on inner links 56—56 of the chains 51—51.

The conveyer elements 34 and 50 are complementary to each other and the carrier slats of one are staggered with respect to the carrier slats of the other. The chains 41—41 of the lower conveyer element are spaced apart a predetermined distance by the carrier slats 42—42, and the chains 51—51 are spaced apart by the carrier slats 53—53 a predetermined distance, which is greater than the distance at which the chains 41—41 are spaced apart. This spacing and the provision of the relieved portions 57—57 in the carrier slats 52—52 permit the chains 41—41 to follow paths parallel to paths of the chains 51—51.

A pair of guide sprockets 60—60 (Figs. 1 and 3) is mounted on a shaft 62. The roller chains 51—51 pass under the guide sprockets 60—60 and the portions thereof passing under the sprockets 60—60 ride in the same plane as the adjacent portions of the roller chains 41—41, which portions are passing through the arcuate portions 36—36 of the guide tracks 40—40, which are J-shaped as viewed in Fig. 1.

The upper and lower conveyer elements 50 and 34 then course upwardly in unison in parallel paths to pairs of guide sprockets 64 and 65 and 66 and 67, respectively (Fig. 2), of identical size, which are mounted on an auxiliary drive shaft 70. As the chains 41—41 and 51—51 leave the arcuate portions 36—36 of the guide tracks 40—40 and the sprockets 60—60, respectively, the stems 43—43 of the carrier slats 42—42 and the stems 53—53 of the carrier slats 52—52 lace the strip 20 therebetween and form it into a zig-zag shape. As the upper conveyer element 50 passes to the guide sprockets 64 and 65, the lower conveyer element 34 passes to the guide sprockets 66 and 67, the roller chains 51—51 being guided by straight guide tracks 58—58 (Fig. 2) and the roller chains 41—41 being guided by straight portions 59—59 of the guide tracks 40—40. The straight portions 59—59 of the tracks 40—40 are parallel to the straight guide tracks 58—58. The stems 43—43 of the slats 42—42 of the portion of the conveyer element 34 passing upwardly along the straight portions 59—59 lie in a plane spaced a slight distance away from the slats 52—52 of the portion of the upper conveyer element 50 passing upwardly along the straight guide tracks 58—58. This distance is such that the stems 43—43 and 53—53 cause the relatively thick strip 20 to assume a zig-zag shape, and positively engage the strip so that the strip does not slip with respect thereto.

As the conveyer elements 34 and 50 pass onto the sprockets 66 and 67, and 64 and 65, respectively, the strip-engaging stems 43—43 of the slats 42—42 separate somewhat and the stems 53—53 separate substantially a like amount. However, because the slats 52—52 are staggered with respect to the slats 43—43, the portion of strip 20 adjacent to the sprockets assumes the form of a series of chords so that the strip 20 is not stretched as the conveyer elements pass around the sprockets 64 and 65, and 66 and 67.

The upper conveyer element 50 passes from the guide sprockets 64 and 65 through straight guide tracks 74—74 to lower guide sprockets 73—73 mounted on a shaft 77. The lower conveyer element 34 passes from the sprockets 66 and 67 into straight portions 78—78 of U-shaped guide tracks 75—75, which straight portions parallel the guide tracks 74—74. The conveyer elements straighten as they enter the guide tracks 74—74 and 75—75 so that the stems 43—43 and 53—53 again lie in closely spaced planes, and the portions of the conveyer elements passing downwardly from the sprockets 64 and 65, and 66 and 67 again positively engage the strip 20 and cause it to reassume a zig-zag shape. The strip 20 is not stretched as it is changed from a series of chords back to a zig-zag shape because the series of chords are of sufficient length to permit the strip to assume the zig-zag shape.

The U-shaped guide tracks 75—75 are provided with arcuate portions 76—76 (Fig. 12), which parallel the paths of the chains 51—51 of the upper conveyer element 50 as they pass around the sprockets 73—73. As the conveyer elements 34 and 50 pass around the arcuate portions 76—76 and the sprockets 73—73, respectively, the zig-zag shape of the strip folds somewhat more because the stems 43—43 and 53—53 (Fig. 12) of the slats assume a sweep circle smaller than the pitch circle of the chains and stretching thereof is prevented.

Figures 1, 11, 12:
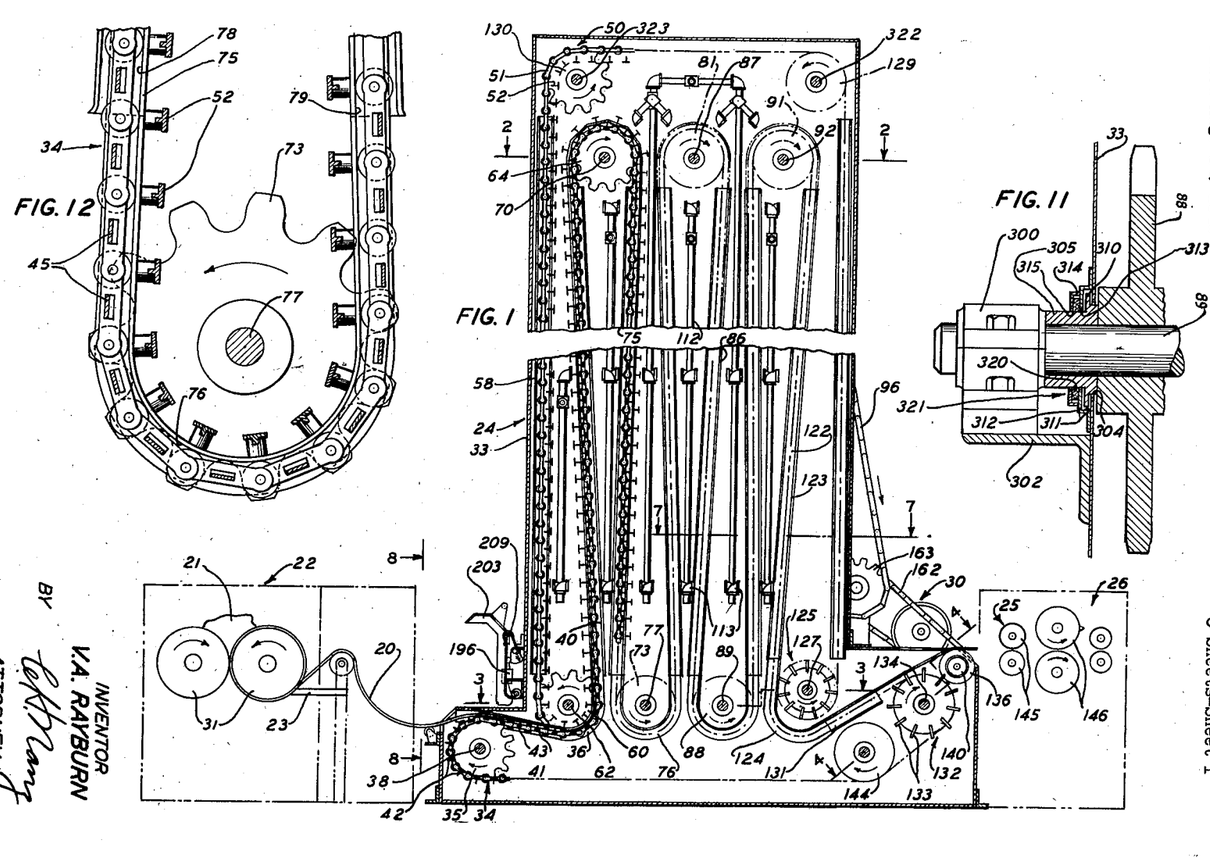
Fig. 1 is a vertical section of an apparatus embodying the invention taken along line 1—1 of Fig. 3.
Fig. 11 is an enlarged, fragmentary, vertical section taken along line 11—11 of Fig. 3.
Fig. 12 is an enlarged, fragmentary, vertical section taken along line 12—12 of Fig. 3.

The lower conveyer element passes from the arcuate portions 76—76 of the U-shaped guide tracks 75—75 upwardly, as viewed in Fig. 1, through straight portions 79—79 of the tracks 75—75 to sprockets 80 and 81 (Fig. 2) mounted on an auxiliary drive shaft 87. The upper conveyer element 50 passes from the guide sprockets 73—73 upwardly, as viewed in Fig. 1, to sprockets 83 and 84 mounted on the shaft 87, the chains 51—51 thereof being guided by straight guide tracks 85—85, which keep these portions of the chains 51—51 parallel to the adjacent portions of the chains 41—41. The chains of the upper conveyer element then are guided downwardly through straight guide tracks 85—85 to sprockets 88—88 mounted on a shaft 89. The chains of the lower conveyer element parallel the paths of the chains of the upper conveyer element and pass through U-shaped guide tracks 86—86, which are identical with the guide tracks 75—75, to drive sprockets 90 and 91 mounted on a main drive shaft 92. The upper conveyer element passes upwardly from the sprockets 88—88 through guide tracks 93—93 to sprockets 94 and 95 secured on the shaft 92.

The main drive shaft 92 is driven by a drive chain 96 through a sprocket 97, and the sprockets 90, 91, 94 and 95 are keyed to the shaft 92. The teeth of the drive sprockets 90 and 91 are aligned with respect to each other, while the teeth of the drive sprockets 94 and 95 are aligned with respect to each other, but are staggered with respect to the teeth of the drive sprockets 90 and 91. This staggering maintains the slats 42—42 staggered with respect to the slats 52—52 throughout the paths of the conveyer elements 34 and 50.

The drive shaft 92 drives a frictionally driven sprocket 99 through an adjustable friction clutch 98. The sprocket 99, through a chain 102, drives a sprocket 100 keyed to the auxiliary drive shaft 87. The sprocket 99 is larger than the sprocket 100 by such an amount that the main drive shaft 92 tends to drive the auxiliary drive shaft 87 at a rate of speed about 5% faster than that of the main drive shaft.

A sprocket 103 mounted on the shaft 87 is driven through an adjustable friction clutch 101 and drives, through a drive chain 106, a sprocket 104 keyed to the auxiliary drive shaft 70. The sprocket 103 is enough larger than the sprocket 104 to cause the shaft 87 to tend to drive the shaft 70 at a rate of speed about 5% in excess of that of the shaft 87.

The sprockets 64 and 66 are mounted rotatably upon the shaft 70 so that they are free to change their positions to adjust for pitch inequalities of the chains of the conveyer elements 34 and 50 and the sprockets around which the chains pass. However, the sprocket 65 is keyed to the shaft 70 and the sprocket 67 is secured to the shaft 70 by an adjustable friction clutch 110 so that the sprockets 65 and 67 are driven by the shaft 70. The sprockets 80 and 83 are freely rotatable on the shaft 87, but the sprocket 81 is secured to the shaft 87 by an adjustable friction clutch 111, and the sprocket 84 is keyed to the shaft 87 so that the sprockets 81 and 84 are driven by the shaft 87. The sprockets 65 and 67 are mounted upon the upper end of the shaft 70, as viewed in Fig. 2, while the sprockets 81 and 84 are mounted upon the lower end of the shaft 87 so that the tensions of the upper ones of the roller chains 41—41 and 51—51 and the lower ones of the roller chains 41—41 and 51—51 will be substantially balanced. The sprockets 81, 84, 65 and 67 take part of the load from the sprockets 90, 91, 94 and 95 secured to the main drive shaft and thereby prevent excess tensions from being placed upon the portions of the chains 41—41 and 51—51 passing to the sprockets 90 and 91, and 94 and 95, respectively. The sprockets 64, 65, 66, 67, 80, 81, 83, 84, 90, 91, 94 and 95 are all of the same size. Thus, the sprockets 65, 67, 81 and 84, which are overdriven, tend to drive the roller chains of the conveyer elements at rates of speed in excess of that at which the sprockets 90, 91, 94 and 95 drive the chains. However, these rates of speed are equalized through the adjustable friction clutches 98 and 101, which slip as they are driven.

The friction clutches 110 and 111 permit the sprockets 67 and 81, respectively, to adjust themselves slightly with respect to the sprockets 65 and 84, respectively, so that the conveyer element 34 can adjust itself slightly relative to the conveyer element 50. This, plus the adjustability of the sprockets 64, 66, 80 and 83, avoids problems, which might be caused by inequalities in the pitch of the roller chains 41—41 and 51—51 and the sprockets around which these chains pass, if the sprockets mounted on the shafts 70 and 87 were all keyed thereto.

Figure 2:
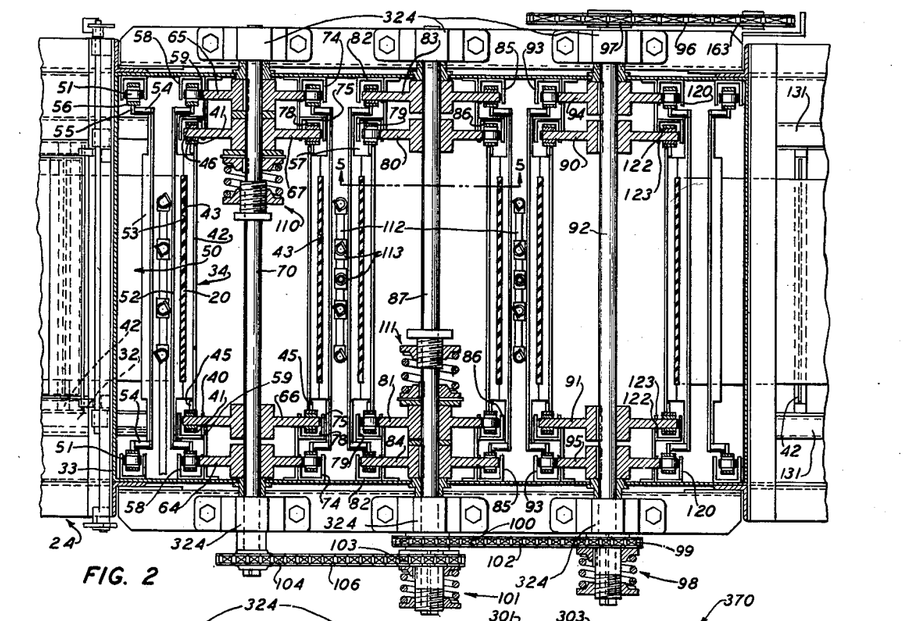
Fig. 2 is an enlarged horizontal section taken along line 2—2 of Fig. 1.

The sprockets 60—60, 73—73 and 88—88 (Fig. 3) are of the same size as the sprockets secured to the shafts 70, 87 and 92 (Fig. 2). The size of these sprockets is chosen with respect to the pitch of the chains 41—41 and 51—51 and the distances which the stems 43—43 of the slats 42—42 and the stems 53—53 of the slats 52—52 are offset from the centerlines of the chains 41—41 and 51—51, respectively, and are large enough to prevent any permanent deformation of the strip 20 as the strip is carried around these sprockets. These sprockets are also large enough to cause the curved portions of the guide tracks 40—40, 75—75 and 86—86 to have a pitch circle large enough to permit the roller chains 41—41 to roll therealong without scraping between the links thereof and the curved portions of the guide tracks, which function is clearly illustrated in Fig. 12. The relieved portions 57—57 of the stems 53—53 of the upper conveyer element also provide clearance for these curved portions of the guide tracks guiding the lower conveyer element so that the chains 41—41 and 51—51 may pass in parallel paths as the conveyer elements curve.

As the strip 20 is advanced through the housing 33, cold water from pipes 112—112 (Figs. 1 and 2) is sprayed from nozzles 113—113 upon the portions of the strip being advanced through the housing. The stems 43—43 and 53—53, which are quite narrow, engage only small, staggered portions of the surfaces of the strip 20 and the slats of each of the conveyer elements are spaced widely apart, whereby substantially all portions of the surfaces of the strip 20 are contacted by the cold water which rapidly cools the strip 20.

The upper conveyer element 50 passes from the sprockets 94 and 95 downwardly through straight guide tracks 120—120 (Fig. 2) and under sprockets 121—121 (Fig. 3) and the lower conveyer element 34 passes through straight portions 122—122 of guide tracks 123—123 into curved portions 124—124 of the guide tracks 123—123. The guide tracks 123—123 are L-shaped, as viewed in Fig. 1, and guide the lower conveyer element in a path diverging from the path in which the upper conveyer element is guided by the guide tracks 120—120 and the sprockets 121—121. As the lower conveyer element is guided away from the upper conveyer element, an upper stripper 125 (Figs. 1 and 3) having blades 126—126 positioned radially on a shaft 127, to which shaft the sprockets 121—121 are keyed, serves to push the strip 20 away from the slats 52—52 of the portion of the upper conveyer element passing around the sprockets 121—121. The blades 126—126 project between and beyond the slats 52—52 and positively push the strip 20 from the slats 53—53. The upper conveyer element then passes upwardly to idler sprockets illustrated by idler sprocket 129, around these idler sprockets, over to idler sprockets illustrated by idler sprocket 130, around the latter, and downwardly to the sprockets 60—60. The roller chains 51—51 drive the sprockets 121—121, which drive the shaft 127 and the stripper 125 in synchronization with the upper conveyer element so that there is no interference between the slats 53—53 and the blades 126—126 as the upper conveyer element is advanced around the sprockets 121—121.

Figure 4:
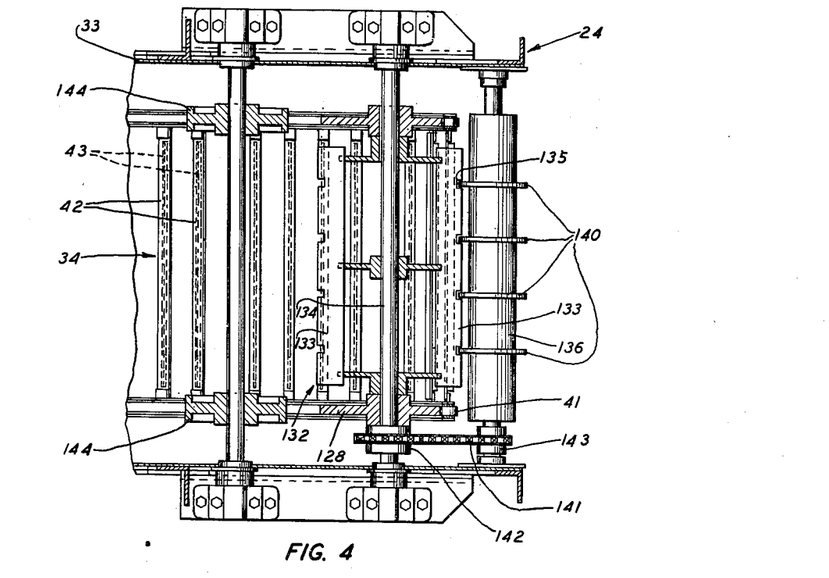
Fig. 4 is an enlarged, fragmentary section taken along line 4—4 of Fig. 1.

The guide tracks 123—123 also are provided with straight portions 131—131, which guide the roller chains 41—41 to sprockets 128—128 (Fig. 4) secured to a shaft 134. A lower stripper 132 secured to the shaft 134 is provided with a plurality of radially arranged blades 133—133, which move in synchronization with the lower conveyer element 34 and project between and beyond the slats 42—42 of the lower conveyer element. The stripper 132 serves to break the strip 20 away from the stems 43—43 of the slats 42—42. The lower conveyer element 34 then passes from the sprockets 128—128 under wide idler wheels 144—144 to the guide sprockets 35—35.

The blades 133—133 are provided with notches 135—135 positioned along their lengths. A guide-out roller 136, having annular ribs 140—140 spaced along the length thereof, is positioned with the annular ribs 140—140 projecting into the notches 135—135. A drive chain 141 driven by a sprocket 142 secured to the shaft 134 serves to rotate the guide-out roller 140 through a sprocket 143, which is smaller than the sprocket 142. The guide-out roller 136 is rotated at such a rate of speed that the peripheries of the annular portions 140—140 move more rapidly than that at which the strip 20 is advanced by the lower conveyer element 34 so that the guide-out roller tends to flip the strip 20 over it and prevent any jamming of the strip 20 as it leaves the lower conveyer element. After the strip 20 has passed over the guide-out roller 140, it passes between drier rolls 145—145 of the drier 25, which serve to remove any moisture therefrom, and thence into shearer rolls 146—146, which cut the strip into slabs.

The shaft 89 (Fig. 3) is mounted in bearings 300 and 301 mounted on angle irons 302 and 303 positioned on the outside of the housing 33. The housing 33 has a hole 304 (Fig. 11) formed therein through which hole the left end of the shaft 89, as viewed in Fig. 11, and a collar 305 project. The collar fits closely between the sprocket 88 and the bearing 300, and is provided with an annular rib 310, which fits into a cavity 311 formed by a dished plate 312. The dished plate 312 is secured to the outside of the housing 33 and has a hole 313 formed therein which provides a slight clearance for the collar 305. A dished plate 314 having a hole 315 therein is secured to the plate 312, and holds an annular packing 320 against the dished plate 312. The packing fits tightly around the collar 305 and prevents water from escaping beyond the cavity 311. The hole 304 is larger than the hole 313 so that excess water entering and accumulating in the cavity 311 pours into the housing 33 through the hole 304 and is prevented in this manner from rising high enough to pass through the hole 313. The rib 310 is spaced close to the walls of the cavity and water entering therebetween forms a thin film which adheres to the walls of the cavity and the surfaces of the rib 310. Thus, water is prevented from escaping from inside housing.

The collar 305, the housing 33, the plates 312 and 314 and the packing 320 form a gland designated generally by the numeral 321, and similar glands are positioned near the ends of the shafts 62, 70, 77, 87, 89, 92 and 134 (Fig. 1) and shafts 322 and 323, all of which shafts are mounted in bearings 324—324 similar to the bearings 300 and 301.

The shaft 38 (Figs. 9 and 10) is mounted in an adjustment and sealing mechanisms illustrated by an adjustment and sealing mechanism 329, which includes slotted bearings illustrated by a slotted bearing 330, which bearings are identically mounted in guide bars illustrated by guide bars 331—331 mounted rigidly on angle irons 345 and 347. The bearing 330 abuts spacing tubes 332—332 and 333—333, which are slidably mounted on the guide bars. An adjustment bolt 335 having a head 336 secured in a socket 340 in the bearing 330 is provided with a threaded portion 341 and a tang 342 over which a wrench (not shown) for turning the bolt fits.

The bolt 335 is threaded into a tapped bore 343 formed in a boss 344 fastened to an angle iron 345. The bolt may be turned by the wrench (not shown) to adjust the position of the bearing 330 relative to the guide bars 331—331, and may be locked in its adjusted position by a lock nut 350. Thus, the shaft 38 can be moved to the right, or the left, as viewed in Fig 9, to loosen or tighten the conveyer element 34. Since the sprockets illustrated by the sprocket 35 are engaged by a portion of the conveyer element 34 which does not parallel any portion of the conveyer element 50, the conveyer element 34 may be tightened or loosened without disturbing the indexed relationship of the slats 42—42 with regard to the slats 53—53.

A gland 351 of the adjusting and sealing mechanism 329 includes a plate 352 fastened to the spacing tubes 332—332 and 333—333 by plates 353 and 354, respectively. The plate 352 is slidably mounted between the housing 33 and a plate 355, and is slid therein when the bearing 339 is adjusted. Ovate openings 360 and 361 formed in the housing 33 and the plate 352, respectively, provide clearance for the plates 354—354 and the shaft 38 when the bearing 330 and the shaft 38 are adjusted. A collar 362, plates 363 and 364 and a packing 365 are similar in construction to the collar 305 (Fig. 11), the plates 312 and 314 and the packing 320, respectively, and with the plate 352 provide an effective seal around the shaft 38.

Figures 9, 10:
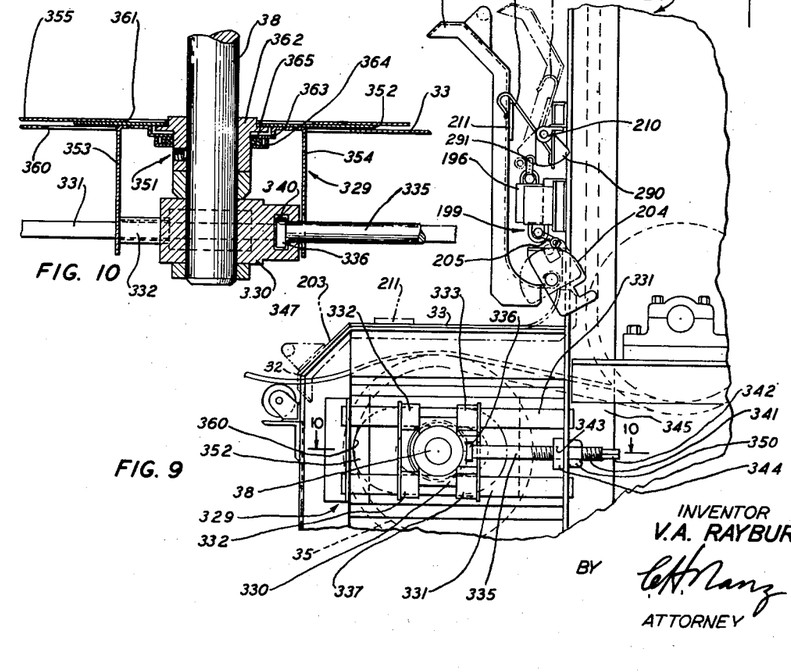
Fig. 9 is an enlarged, fragmentary, vertical section taken along line 9—9 of Fig. 8.
Fig. 10 is an enlarged, fragmentary, horizontal section taken along line 10—10 of Fig. 9.

The shaft 127 (Fig. 3) is mounted by adjustment and sealing mechanisms 370—370, which are identical with the adjustment and sealing mechanism 329, but are positioned substantially 90° in a counterclockwise direction, as viewed in Fig. 9, from the mechanism 329. Thus, the conveyer element 50 may be tightened or slacked, and since the portion of the conveyor element 50 passing around the sprockets 121—121 is not coursing with the conveyer element 34, tightening or slacking the upper conveyer element at this point does not affect the indexing of the slats 52—52 with respect to the slats 42—42. The adjustment and sealing mechanisms illustrated by the mechanism 329 and the mechanisms 370—370 provide independent adjustments of the shafts 38 and 127, respectively.

Figure 13:
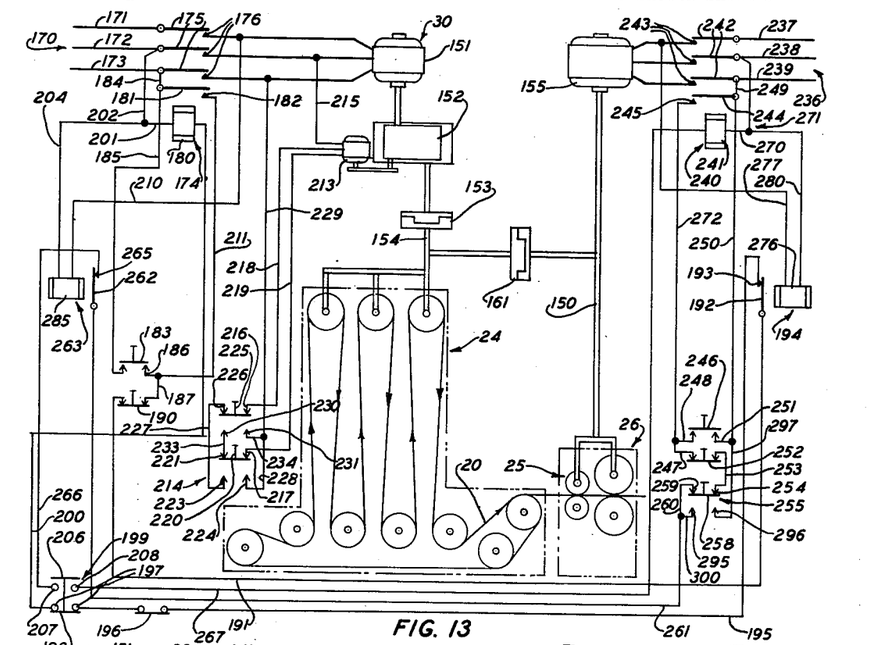
Fig. 13 is a diagrammatic view of the apparatus.

An electric motor 151 (Figs. 7 and 13) of the differential drive assembly 30, when energized, through a variable gear reduction box 152 and a gear reduction box 149, serves to drive a one-way clutch 153, which is mounted on a shaft 154. A second electric motor 155, when energized, serves, through a gear reduction box 156, to drive a shaft 150, which drives the drier rolls 145—145 and the shearer rolls 146—146. The shaft 150, through a drive chain 162, rotates a second one-way clutch 161 mounted on the shaft 154. A sprocket 163 keyed to the shaft 154 drives the drive chain 96, and the conveyer elements 34 and 50 are driven whenever the shaft 154 is driven. The motor 151 rotates the shaft 154 at one speed, and the second motor 155 through the one-way clutch 161 rotates the shaft 154 at a slower speed than that at which the shaft is rotated by the motor 151. The clutches 153 and 161 are so mounted on the shaft 154 that each rotates the shaft 154 in the same direction. Since the clutches 153 and 161 are one-way clutches, when either the motor 151 the motor 155 is energized, there is no force exerted between the shaft 154 and the one-way clutch associated with the unenergized motor. Hence, the unenergized motor does not interfere with the rotation of the shaft 154.

A control circuit for the motors 151 and 155 (Fig. 13) comprises a power line 170, which includes conductors 171, 172 and 173 and serves as a source of power to the motor 151. A holding relay 174 controls the operation of the motor 151 and includes contactors 175—175 and contacts 176—176 in the power line 170. The contactors 175—175 normally are out of engagement with the contacts 176—176, but are moved into engagement with the contacts 176—176 to energize the motor 151 when a winding 180 of the relay 174 is energized. A holding contactor 181 of the relay 174 also is moved into engagement with a holding contact 182 thereof when the winding 180 is energized.

To initially energize the winding 180, a normally-open, momentary, starting switch 183 is closed. The closing of the switch 183 closes a circuit from the power line 170 to the winding 180 through conductors 173, 184 and 185, the starting switch 183, conductors 186 and 187, a normally-closed, momentary, stopping switch 190, a conductor 191, a contactor 192 and a contact 193 of a block-out relay 194, a conductor 195, a safety stop switch 196, contacts 197—197 and a contactor 198 of a safety holding switch 199, a conductor 200, the winding 180, and conductors 201, 202 and 172. The contactors 175—175 then are moved into engagement with the contacts 176—176 and the motor 151 is energized, whereby the cooler 24 is driven.

In order to energize the winding 180, a cover 203 (Figs. 8 and 9) for the entrance 32 must be in the position in which it is shown in broken lines in Fig. 9, which position is designated its partially open position. When the cover is in its partially open position, a cam 204 movable therewith pivots an arm 205 of the switch 199, whereby the contactor 198 is moved into engagement with the contacts 197—197 and a contactor 206 (Fig. 13) of the switch 199 is moved out of engagement with contacts 207 and 208 thereof. Hooks 209—209 (Figs. 8 and 9) rigidly fastened to a rotatable rod 210 may be used to engage a bar 211 to prevent the cover from falling from its partially open position to the position in which it is shown in full lines, which position is designated its closed postion. When the cover is in its closed position, the arm 205 holds the contactor 206 (Fig. 13) of the switch 199 in engagement with the contacts 207 and 208 and the contactor 198 out of engagement with the contacts 197—197.

When the cover 203 is latched in its partially open position by the hooks 209—209 and the winding 180 is energized as described hereinabove, the contactor 181 is moved into engagement with the contact 182, which engagement closes a holding circuit for the winding 180, and the starting switch 183 then is opened. However, after the starting switch 183 is opened, the winding 180 is energized through the following circuit: the conductor 184, the contactor 181, the contact 182, conductors 211 and 187, the stopping switch 190, the conductor 191, the contactor 192, the contact 193, the conductor 195, the switch 196, the contacts 197—197, the contactor 198, the conductor 200, the winding 180 and the conductors 201 and 202. To de-energize the motor 151, the stopping switch 190 is opened, which breaks the circuit to the winding 180, and the contactors 175—175 and 181 fall out of engagement with the contacts 176—176 and 182, respectively.

A motor 213 for varying the ratio between the input speed and the output speed of the gear reducer 152 to adjust the speed of the cooler 24 is controlled by a switch 214. The motor 213 is connected to the conductor 172 by a conductor 215 and to contacts 216 and 217 by conductors 218 and 219, respectively. A contactor 220 normally is in engagement with the contact 217 and a contact 221 but may be moved out of engagement with these contacts and into engagement with contacts 223 and 224 to increase the output speed of the variable gear box 152. When the contactor 220 is moved into engagement with the contacts 223 and 224, and the holding relay 174 has been actuated to move the contactors 175—175 into engagement with the contacts 176—176, to drive in a predetermined direction to increase the output speed of the gear box, the motor 213 is energized through the following circuit: the conductors 172 and 215, the winding of the motor 213, the conductor 218, the contact 216, a contactor 225, a contact 226, a conductor 227, the contact 223, the contactor 220, the contact 224 and conductors 228, 229 and 173. When the output speed of the variable gear box has been raised as high as desired, the contactor 220 is moved out of engagement with the contacts 223 and 224 and into engagement with the contacts 217 and 221, whereby the circuit to the motor 213 is broken and the motor is stopped leaving the variable gear box 152 in its adjusted condition.

If it is desired to decrease the speed of the cooling tower 24, after the contactors 175—175 have been moved into engagement with the contacts 176—176, the contactor 225 is moved out of engagement with the contacts 216 and 226 and into engagement with contacts 230 and 231. Upon engagement of the contactor 225 with the contacts 230 and 231, the motor 213 is energized through the following circuit: the conductors 172 and 215, the winding of the motor 213, the conductor 219, the contact 228, the contactor 220, the contact 221, a conductor 233, the contact 230, the contactor 225, the contact 231 and conductors 234, 229 and 173. This causes the motor 213 to be driven in a direction opposite to the direction in which it increases the output speed of the variable gear box 152, in which opposite direction the output speed of the variable gear box is decreased. After the output speed of the variable gear box has been reduced the desired amount, the contactor 225 is moved out of engagement with the contacts 230 and 231 to break the circuit to the motor 213 and back into engagement with the contacts 216 and 226, whereby the motor 213 is stopped.

When it is desired to drive the drier 25 and the shearer 26 as well as the cooling tower 24, the cover 203 is moved to its closed position. When the cover is closed, the cam 204 moves the arm 205 in a clockwise direction, as viewed in Fig. 9, and the arm 205 moves the contactor 198 (Fig. 13) out of engagement with the contacts 197 so that the motor 151 can not be energized, and moves the contactor 206 into engagement with the contacts 207 and 208 so that the motor 155 can be energized in a manner indicated hereinbelow. A holding relay 240 serves to control the energization of the motor 155 and includes contactors 242—242 and contacts 243—243 in conductors 237, 238 and 239 of a power line 236 leading to the motor 155. When a winding 241 of the relay is energized, the contactors 242—242 are moved into engagement with the contacts 243—243, whereby the motor 155 is energized. The relay 240 also includes a holding contactor 244 and a holding contact 245, which are brought into engagement with each other when the winding 241 is energized.

To initially energize the winding 241, a normally-open, momentary starting switch 246 is closed. The winding 241 of the relay 240 then is energized through the following circuit: conductors 249, 250 and 251, the starting switch 246, conductors 248 and 247, a normally-closed, momentary stopping switch 252, a conductor 253, a contact 254 of a jogging switch 255, a contactor 258, which is in engagement with a contact 259, the contact 259, conductors 260 and 261, a contactor 262 of a block-out relay 263, a contact 265, a conductor 266, the contact 207, the contactor 206, the contact 208, a conductor 267, the winding 241 and conductors 270, 271 and 238. After the winding 221 has been energized, the contactors 242—242 are moved into engagement with the contacts 243—243, whereby the motor 155 is energized, and the contactor 244 is moved into engagement with the contact 245. When the contactors 242—242 are in engagement with the contacts 243—243, the motor 155 is energized and drives the cooler 24, the drier 25 and a shearer 26.

After the winding 241 of the holding relay 240 has been energized, the contactors 242—242 and 244 are moved into engagement with the contacts 243—243 and 245, respectively. The starting switch 246 then is released but the winding 241 remains energized through the following holding circuit: conductors 239 and 249, the contactor 244, the contact 245, conductors 272 and 247, the stopping switch 252, the conductor 253, the contact 254, the contactor 258, the contact 259, the conductors 260 and 261, the contact 262, the contactor 265, the conductor 266, the contact 207, the contactor 206, the contact 208, the conductor 267, the winding 241, and conductors 270, 271 and 238. To stop the motor 155, the stopping switch 252 is opened, which opening breaks the holding circuit to the winding 241 of the relay 240, whereby the contactors 242—242 and 244 drop out of engagement with the contacts 243—243 and 245, respectively. When the contactors 242—242 move out of engagement with the contacts 243—243, the motor 155 is deenergized and the cooler 24, the drier 25 and the shearer 26 come to a stop.

When the contactors 242—242 are in engagement with the contacts 243—243, a winding 276 of the block-out relay 194 is energized through a conductor 277 and conductors 271 and 280. When the winding 276 of the relay 194 is energized, the engagement between the contactor 192 and the contact 193 is broken, whereby the energization of the winding 180 of the holding relay 174 is rendered impossible. Thus, the motor 151 can not be energized while the motor 155 is energized. Conversely, when the winding 180 of the holding relay 174 is energized and the motor 151 is energized, a winding 285 of the block- out relay 263 is energized. When the winding 285 of the block-out relay 263 is energized, the engagement between the contactor 262 and the contact 265 is broken, whereby no circuit to the winding 241 of the holding relay 240 can be closed. Thus, when the motor 151 is energized, the motor 155 can not be energized.

When the cover 203 (Figs. 8 and 9) is not in its closed position, the contactor 206 (Fig. 8) of the safety holding switch 199 is out of engagement with the contacts 207 and 208, whereby the circuit to the winding 241 of the relay 240 is open so that the motor 155 can not be driven. When the cover 203 (Figs. 9 and 10) is in its closed position, the contactor 198 (Fig. 8) is out of engagement with the contacts 197—197 so that the circuit to winding 180 of the relay 174 is open and the motor 151 can not be energized.

When the strip 20 (Fig. 1) is fed into the cooling tower 24 and only the cooler is driven, the cover 203 is held in its partially open position by the hooks 209—209. However, if anyone gets too close to the entrance 32 of the cooler and pushes the cover, the cover is moved in a clockwise direction, as viewed in Fig. 9, and rotates the hooks 209—209 in a clockwise direction so that a cam 290 secured to the rod 210 strikes an arm 291 of the safety stop switch 196 and opens the switch 196, whereby the circuit to the winding 180 of the relay 174 is opened and the motor 151 is stopped.

When it is desired to operate the cooling tower 24, the drier 25 and the shearer 26 under manual control, such as when the forward end of the strip 20 is guided to the drier, and the shear 26, the contactor 258 of the jogging switch 255 is moved out of engagement with the contacts 254 and 259 and into engagement with the contacts 295 and 296 of the jogging switch. When the contactor 258 is moved into engagement with the contacts 295 and 296, the holding relay 240 is energized through the following circuit: conductors 239, 249, 250 and 297, the contact 296, the contactor 258, the contact 295, conductors 300 and 261, the contactor 262, the contact 265, the conductor 266, the contact 207, the contactor 206, the contact 208, the conductor 267, the winding 241 of the holding relay 240 and the conductors 270, 271 and 238, whereby the relay 240 is actuated and the motor 155 is energized. The cooling tower, the drier, and the shearer thus may be driven as long as desired by holding the contactor 258 into engagement with the contacts 295 and 296. To stop this movement, the contactor 258 is released, whereby it moves out of engagement with the contacts 295 and 296. This deenergizes the winding 241, whereby the motor 155 is deenergized.

In the operation of the apparatus described hereinabove the mass of plastic material 21 (Fig. 1) is thoroughly milled in the mill 22. After the mass of material has been thoroughly milled, the strip 20 is formed by the mill, is stripped therefrom by the stripper 23 and is guided into the entrance 32 of the cooling tower 24. The starting 183 (Fig. 8) then is closed, whereby the motor 151 is energized and drives the conveyer elements 34 and 50 (Fig. 1) in synchronization with the speed at which the strip 20 is stripped from the mill rolls 31—31. The conveyer elements 34 and 50 then advance the strip 20 through the cooling tower in the tortuous path in which they are guided therethrough. As the strip 20 is advanced through the cooling tower, the nozzles 113—113 spray cold water on the strip and cool it. When the forward end of the strip 20 reaches the stripper 132, the stopping switch 190 (Fig. 13) is opened to stop the motor 151. The strip 20 then is cut from the mass of the material 21 (Fig. 1) at the mill and the cover 203 (Figs. 8 and 9) is moved to its closed position so that the motor 155 (Fig. 13) can be started.

The jogging switch 255 then is actuated until the forward end of the strip 20 is fed to the drier 25. The starting switch 246 then is closed to energize the motor 155. The motor 155 then drives the cooling tower 24, the drier and the shearer 26 at synchronized speeds, and the strip 20 is advanced through the cooling tower, the drier and the shearer, which cuts the strip 20 into slabs. After the strip 20 has been advanced completely through the shearer 26, the stopping switch 252 is opened, whereby the motor 155 is deenergized and the cooling tower, the drier and the shearer are stopped. The operation described hereinabove then may be repeated upon another strip similar to the strip 20.

The apparatus described hereinabove serves to positively engage the strip 20 (Fig. 1) and convey it without permanent deformation through the cooling tower 24 in synchronization either with the mill 22, or the drier 25 and the shearer 26. The apparatus serves to cool, dry and shear the strip 20 very rapidly and effectively. The conveyer elements 34 and 50 positively engage the strip 20 and convey it through the drier 24 without stretching the strip, whereby the strip is not deformed by the cooling operation.

Since the cooling tower 24 is relatively high and the conveyer elements 34 and 50 course together upwardly and downwardly distances almost equal to the height of the cooling tower, the cooling tower cools long lengths of strips very efficiently, but occupies a relatively small amount of floor space. Since the slats 42—42 and 52—52 positively engage the strip 20 at short distances as they convey the strip, the strip is raised and lowered through the relatively high cooling tower without stretching the strip.

What is claimed is:

1. In a strip-handling apparatus, an endless conveyer element having a plurality of slats spaced uniformly along the length thereof, means for driving the conveyer element along a predetermined path to advance a strip of material engaged by the slats, a plurality of blades so mounted adjacent to the slats that the blades assume the positions of radii of a cylinder, and project between the slats, and means for revolving the blades in synchronization with the driving means, whereby the blades push the strip of material from the slats.

2. In a strip-handling apparatus, an endless conveyer element having a plurality of transverse slats spaced uniformly along the length thereof, means for driving the conveyer element along a predetermined path to advance a strip of material engaged by the slats, a plurality of blades so mounted that the blades assume the positions of radii of a cylinder and project between the slats, means for revolving the blades in synchronization with the driving means, whereby the blades push the strip of material from the slats, and means for flipping the strip of material away from the blades.

3. In a strip-handling apparatus, an endless conveyer element, means for mounting the conveyer element for movement along a predetermined path, means for moving the conveyer element along said path, a stripper positioned adjacent to a predetermined point on said path for moving a strip of material carried by the conveyer element out of engagement with the conveyer element, and a roller mounted adjacent to the stripper for flipping the strip of material away from the conveyer element and the stripper.

4. In a strip-handling apparatus, an endless conveyer element having a plurality of T-shaped slats spaced uniformly therealong, a second endless conveyer element having a plurality of T-shaped slats spaced uniformly therealong, means for guiding the conveyer elements along paths in which the slats of a portion of the first conveyer element are staggered with respect to and are spaced closely to the slats of a portion of the second conveyer element, a plurality of radially extending stripper blades, means for mounting the stripper blades in positions in which they project between and beyond the slats of one of the conveyer elements at one point in the path thereof, means for separating the two conveyer elements at said point, and means for driving the conveyer elements and the stripper blades in synchronization.

5. In a strip-handling apparatus, a pair of matched roller chains, a plurality of T-shaped slats carried by and extending between the chains, a pair of U-shaped guide tracks fitting over the chains to guide the chains along predetermined paths, a second pair of matched roller chains, a plurality of T-shaped slats which are longer than the first slats carried by and extending between the second pair of chains, and a second pair of U-shaped guide tracks positioned outside of and parallel to the first pair of U-shaped tracks for guiding the second pair of chains in paths parallel to the paths of the first pair of chains, the slats carried by the second pair of chains in paths parallel to the paths of the first pair of chains, the slats carried by the second pair of chains being provided with relieved portions to provide clearance for the first pair of guide tracks.

6. In a strip-handling apparatus, a pair of matched roller chains, a group of T-shaped slats, means for securing each of the slats to the chains in a position in which it is perpendicular to the chains, a pair of U-shaped guide tracks fitting over the chains to guide the chains therealong, a second pair of matched chains, a second group of T-shaped slats which are longer than the first-mentioned slats, means for securing each of the second group of slats to the second pair of chains in a position in which it is perpendicular thereto, a plurality of stanchions for spacing the second group of slats from the second pair of chains, and a second pair of U-shaped guide tracks positioned outside of and parallel to the first-mentioned pair of U-shaped tracks for guiding the second pair of chains in paths parallel to the paths of the first-mentioned pair of chains, the slats carried by the second pair of chains being provided with relieved portions to provide clearance for the first-mentioned pair of guide tracks.

7. In a strip-handling apparatus, a pair of U-shaped guide tracks, a pair of roller chains positioned in said guide tracks, a plurality of T-shaped slats carried by and extending between said chains, a second pair of U-shaped guide tracks positioned in the same plane as and outside of the first-mentioned pair of guide tracks, a second pair of roller chains carried in the second pair of guide tracks, and a plurality of T-shaped slats of greater length than said first-mentioned slats carried by the second pair of chains and extending from one to the other of the second pair of chains, the slats carried by the second pair of chains being provided with relieved portions to provide clearance for the first-mentioned pair of guide tracks.

8. In a strip-handling apparatus, a pair of matched roller chains having links of the same pitch, a group of slats of equal lengths extending from one to the other of the chains and secured to the central portions of links thereof, a second pair of matched roller chains which are identical with the first-mentioned pair of chains, a second group of slats, means carried by the second pair of roller chains and secured to the central portions of the links thereof for connecting the second group of slats to the second pair of chains, a drive shaft, a pair of identical sprockets keyed to the driving shaft for advancing the first pair of roller chains, a second pair of sprockets which are identical with the first pair of sprockets and are keyed to the drive shaft in bracketing relationship with respect to the first pair of sprockets for advancing the second pair of chains, said connecting means being relieved to provide clearance for the first pair of chains and for the first pair of sprockets means for guiding portions of the first pair of chains being advanced toward the first sprockets in a straight line, and means for guiding portions of the second pair of chains in paths parallel to said portions of the first pair of chains and for positioning the last-mentioned slats for movement along a plane spaced close to the path along which the first slats move, whereby a relatively thick strip of material is interlaced between the slats and is positively carried thereby.

9. A strip-handling apparatus, which comprises an endless conveyer element having a pair of chains and a plurality of slats secured to and extending between the chains, a second endless conveyer element having a second pair of chains and a plurality of slats secured to and extending between the last-mentioned chains, said last-mentioned slats being longer than the first-mentioned slats and being provided with relieved end portions to provide clearance for the first chains when the first chains are parallel with and are spaced between the second pair of chains, a pair of sprockets, means for guiding the second pair of chains to the sprockets, said sprockets serving to guide the second chains in an arcuate path, means for guiding the second pair of chains from the sprockets, and a pair of arcuate guide tracks positioned between the sprockets for guiding the first pair of chains in paths parallel to the paths around the sprockets of the second pair of chains.

10. In a conveyer, an endless conveyer element, a second endless conveyer element, means for guiding the conveyer elements in paths in which portions of the conveyer elements course together and portions thereof are separated, means for engaging portions of the conveyer elements coursing together to drive the conveyer elements along their respective paths in indexed relationship, means engaging a portion of the first conveyer element separated from the other conveyer element for adjusting the tautness of the first conveyer element, whereby the tautness of the first conveyer element may be adjusted without affecting the indexed relationship of the conveyer elements, and means engaging a portion of the second conveyer element separated from the first conveyer element for adjusting the tautness of the second conveyer element, whereby the second conveyer element may be adjusted without affecting the indexed relationship of the conveyer elements.

11. In a strip-handling apparatus, an endless conveyer element including a pair of chains, a second endless conveyer element including a pair of chains, a group of driving sprockets in engagement with the chains of the conveyer elements, a shaft upon which the sprockets are keyed, means for driving the shaft to advance the conveyer elements, whereby the conveyer elements may advance a strip of material therewith, a pair of sprockets in engagement with the chains of the first-mentioned conveyer element, a second pair of sprockets in engagement with the chains of the second conveyer element, a second shaft upon which the said pairs of sprockets are mounted, at least one of the first-mentioned pair of sprockets being keyed to the second shaft, at least one of the second pair of sprockets being frictionally secured to the second shaft, a friction drive for driving the second shaft, a third pair of sprockets in engagement with the first-mentioned conveyer element, a fourth pair of sprockets in engagement with the second conveyer element, a third shaft upon which the sprockets of the third and fourth pairs are mounted, at least one of the sprockets of the third pair being keyed to the third shaft and at least one of the sprockets of the fourth pair being frictionally secured to the third shaft, and a second friction drive for driving the third shaft.

12. A strip-handling apparatus, which comprises an endless conveyer having a pair of chains and a plurality of slats secured to and extending between the chains, a second endless conveyer having a second pair of chains and a plurality of slats secured to and extending between the last-mentioned chains, said last-mentioned slats being longer than the first-mentioned slats and being provided with relieved end portions to provide clearance for the first pair of chains when the first pair of chains are parallel with and are spaced between the second pair of chains, a pair of sprockets for guiding the second pair of chains in an arcuate path, and a second pair of sprockets positioned between the first pair of sprockets for guiding the first pair of chains in paths parallel to and in the same plane as the paths of the second pair of chains.

13. In a strip-handling apparatus, an endless conveyer including a pair of endless chains, a shaft, a pair of main drive sprockets fastened positively to the shaft for engaging the chains, a second endless conveyer including a pair of chains, the chains of one of the conveyers bracketing the chains of the other conveyer, a second pair of main drive sprockets fastened positively to the shaft for engaging the chains of the second conveyer, means for rotating the shaft to advance the conveyers at a predetermined rate of speed, a second shaft spaced from the first shaft, a pair of auxiliary drive sprockets mounted on the second shaft for engaging the chains of one of the conveyers, at least one of the auxiliary drive sprockets being fastened positively to the second shaft, a second pair of auxiliary drive sprockets mounted on the second shaft for engaging the chains of the other conveyer, a friction clutch for connecting one of the second pair of auxiliary drive sprockets to the second shaft, and a slipping drive for rotating the second shaft, said slipping drive tending to rotate the auxiliary drive sprockets at such rates of speed as to advance the conveyers at a greater rate of speed than that at which the main drive sprockets advance the conveyers.

14. In a strip-handling apparatus, a pair of matched roller chains, a plurality of slats carried by and extending between the chains, a pair of guide tracks fitting over the chains to guide the chains along predetermined paths, a second pair of matched roller chains, a plurality of slats which are longer than the first slats carried by and extending between the second pair of chains, and a second pair of guide tracks positioned outside of and parallel to the first pair of guide tracks for guiding the second pair of chains in paths parallel to the paths of the first pair of chains, the slats carried by the second pair of chains being provided with relieved portions to provide clearance for the first pair of guide tracks.

15. In a strip-handling apparatus, a pair of matched roller chains, a group of slats, means for securing each of the slats to the chains in a position in which it is perpendicular to the chains, a pair of guide tracks for guiding said pair of chains therealong, a second pair of matched chains, a second group of slats which are longer than the slats of the first-mentioned group, means for securing each of the second-mentioned group of slats to the second-mentioned pair of chains in a position in which it is perpendicular thereto, a plurality of spacers for spacing the second-mentioned group of slats from the second-mentioned pair of chains and for providing clearance for the first-mentioned pair of guide tracks, and a second pair of guide tracks positioned outside of and parallel to the first-mentioned pair of guide tracks for guiding the second-mentioned pair of chains in paths parallel to the paths of the first-mentioned pair of chains.

16. In a strip-handling apparatus, a pair of matched endless chains, a group of slats, means for securing the slats to the chains, in positions extending from one to the other of the chains, a second pair of matched endless chains, a second group of slats which are longer than the first group of slats, means for securing the slats of the second group to the second pair of chains in positions extending from one to the other of the second pair of chains, said second group of slats having relieved portions to provide clearance for the first pair of endless chains, means for indexing the pairs of chains in positions in which the slats secured to portions of the second pair of chains are in opposed and staggered relationships with respect to the slats secured to portions of the first pair of chains, means for guiding the pairs of chains along coplanar paths which are straight in portions, concave downwardly in a portion thereof and concave upwardly in a portion thereof, all of said slat-securing means being so positioned as to mount the slats of both groups on a single side of the paths of the chains such that the slats follow paths outside of said concave downwardly portion of the first-mentioned paths and inside of the concave upwardly portion thereof, and means for driving both of the pairs of chains in synchronization to advance a strip of material engaged by the slats of the first group and the slats of the second group.

17. In a strip-handling apparatus, a pair of matched roller chains having links of the same pitch, a group of slats of equal lengths extending from one to the other of the chains for engaging one side of a strip of material, means secured to the central portions of links of the chains for connecting the slats to the chains, a second pair of matched roller chains having the links of the same pitch as the links of the first pair of chains, a second group of slats, for engaging the opposite side of a strip of material engaged by the slats of the first group, a second slat-connecting means carried by the second pair of roller chains and secured to the central portions of the links thereof for connecting the second group of slats to the second pair of chains, a pair of identical sprockets for advancing the first pair of roller chains, and a second pair of sprockets identical with and mounted concentrically and in bracketing relationship with respect to the first-mentioned pair of sprockets for advancing the second pair of chains, said second slat-connecting means being relieved to provide clearance for the first pair of chains and for the first-mentioned pair of sprockets, both of said slat-connecting means serving to mount the slats of both groups in positions such that portions of the slats move outside of the pitch circle of the sprockets as the chains are advanced over the sprockets.

18. A strip-handling apparatus, which comprises a pair of chains, a second pair of chains, a pair of identical sprockets for engaging the second pair of chains, said sprockets serving to guide the second pair of chains in an arcuate path, arcuate means positioned between the sprockets for guiding the first pair of chains in paths coplanar to the paths around the sprockets of the second pair of chains, a group of slats for engaging a strip of material, means for securing the slats to the first-mentioned pair of chains in positions extending between those chains and so offset with respect to those chains that the strip-engaging portions of the slats follow paths inside the pitch circle of the sprockets and the arcuate means, a second group of slats for engaging a strip of material engaged by the first-mentioned slats, means for securing the second group of slats to the second pair of chains in positions extending between those chains and so offset with respect to those chains that the strip-engaging portions of the slats follow paths inside the pitch circle of the sprockets and the arcuate means, said last-mentioned slat-securing means being relieved to provide clearance for the arcuate means and the first-mentioned chains.

VINCENT A. RAYBURN.

REFERENCES CITED

The following references are of record in the file of this patent:

UNITED STATES PATENTS

| Number | Name | Date |
|---|---|---|
| 773,297 | Nash | Oct. 25, 1904 |
| 1,583,034 | Valerius et al. | May 4, 1926 |
| 1,696,386 | Corey | Dec. 25, 1928 |
| 1,676,714 | Smallidge | July 10, 1928 |
| 1,699,489 | Lewis | Jan. 15, 1929 |
| 1,846,324 | Finn | Feb. 23, 1932 |
| 2,001,345 | Forty | May 14, 1935 |
| 2,248,333 | Burbank | July 8, 1941 |
| 2,249,792 | Skinner | July 22, 1941 |
| 2,283,022 | Wallgren | May 12, 1942 |